Oct. 24, 1967  W. H. ALLAN  3,348,633
METHOD AND APPARATUS FOR LUBRICATING FRICTION DRAFT GEAR
Filed June 22, 1964  4 Sheets-Sheet 1

INVENTOR.
William H. Allan
BY
Atty.

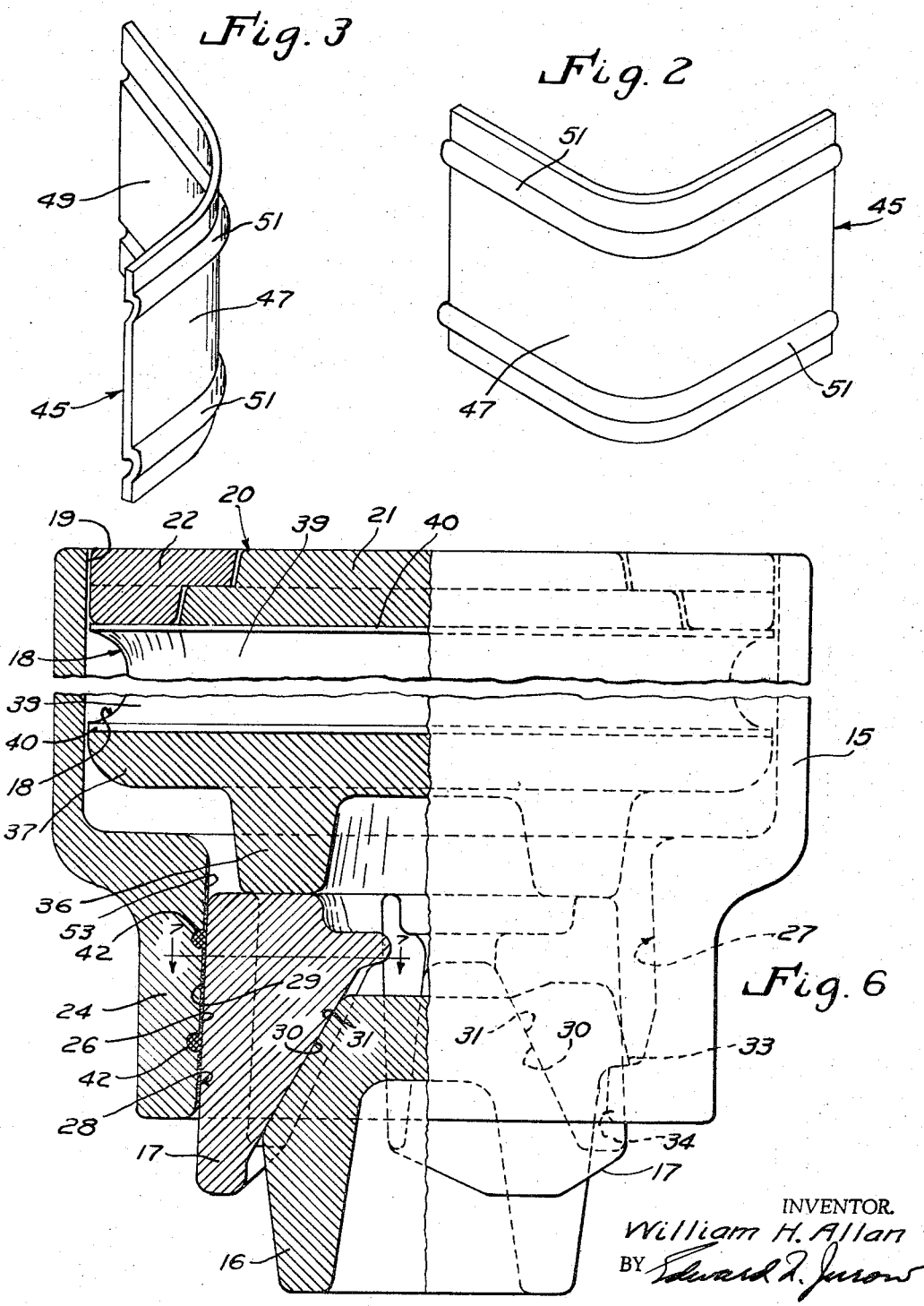

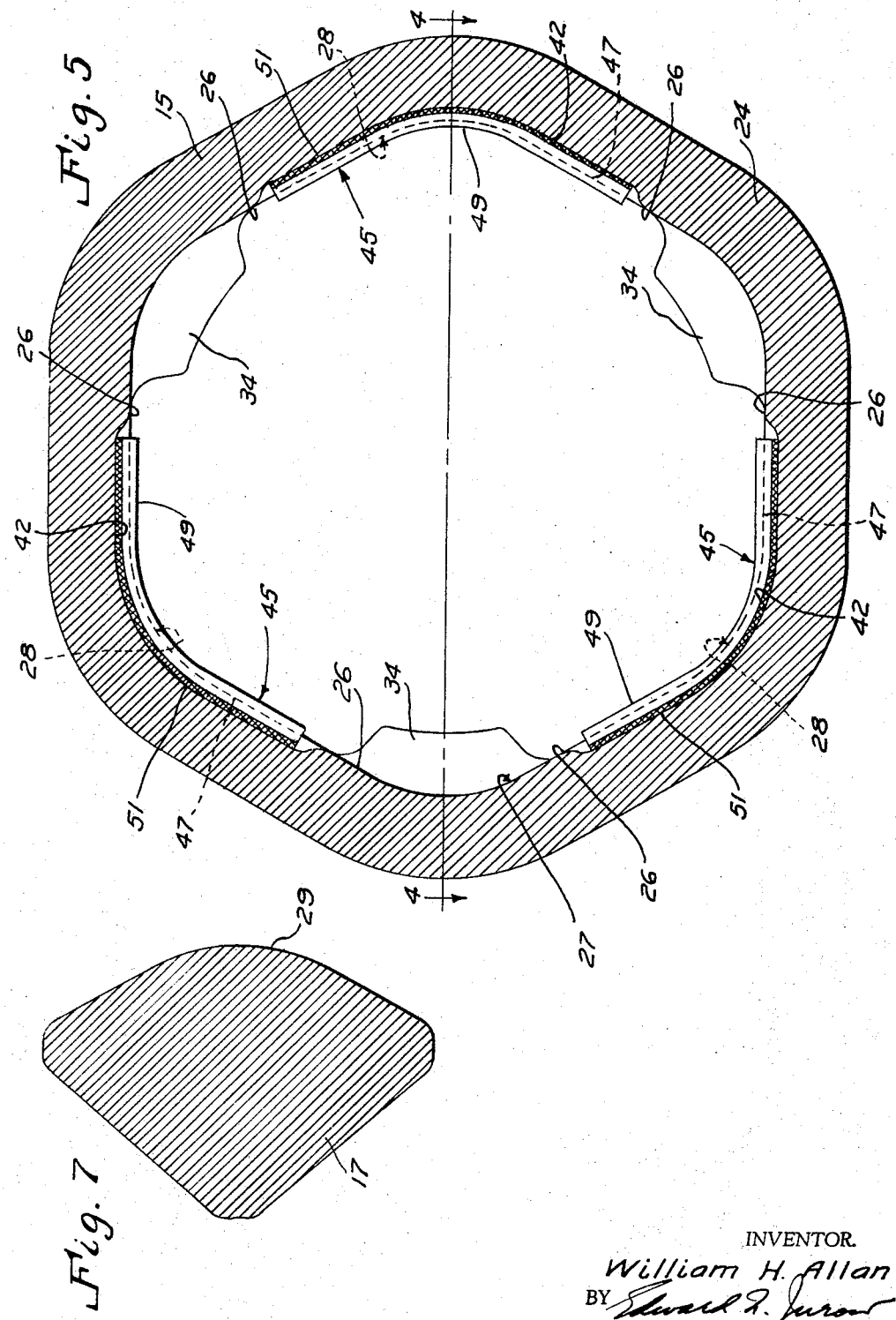

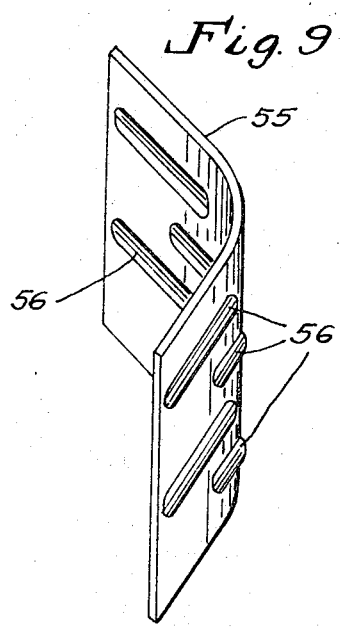
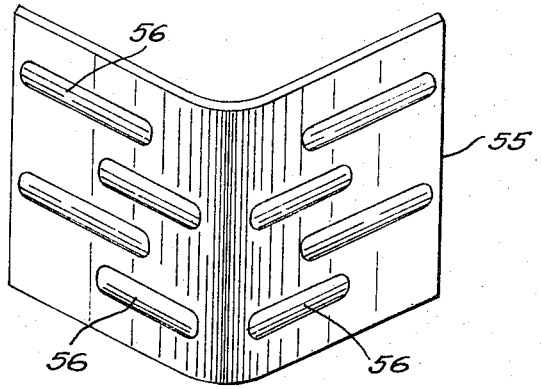
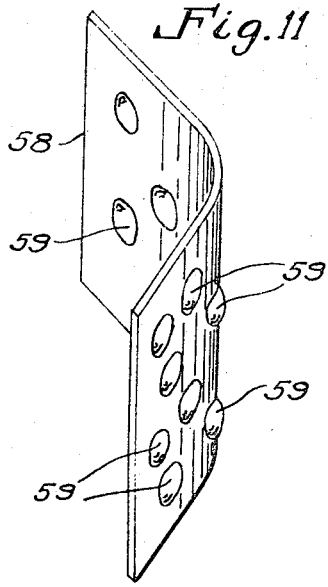
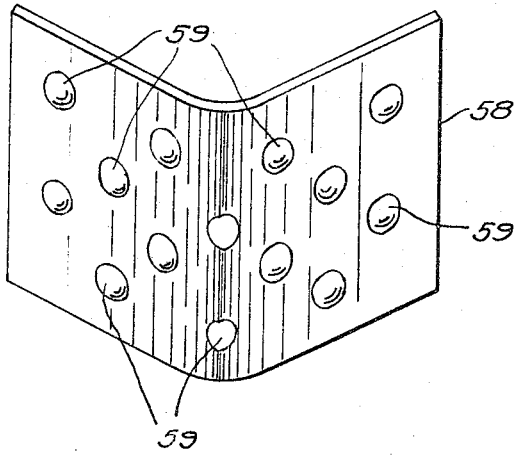

United States Patent Office 3,348,633
Patented Oct. 24, 1967

3,348,633
METHOD AND APPARATUS FOR LUBRICATING FRICTION DRAFT GEAR
William H. Allan, Kenmore, N.Y., assignor to W. H. Miner, Inc., Chicago, Ill., a corporation of Delaware
Filed June 22, 1964, Ser. No. 376,633
9 Claims. (Cl. 184—1)

The present invention relates to friction draft gears and, more particularly, to lubrication of the friction bores thereof.

Friction draft gears are characterized by a casing or housing having the inner or rear end closed by an end wall, which may be either integral or removable, by a fraction clutch of any of a number of types disposed in its outer or front open end, and by resilient means which may be in the form of coil springs, elastomeric pads, hydraulic devices, etc. disposed in the casing between the friction clutch and the rear wall. A typical friction clutch is characterized by a friction bore which is defined by two or more inwardly converging internal friction surfaces at the open front end of the casing, by a series of friction shoes disposed in the friction bore and having outer friction surfaces complementary to the internal friction surfaces of the friction bore, and by a central wedge member having friction surfaces which are engageable with complementary inner friction surfaces of the friction shoes in a manner such that same are wedged outwardly against the friction bore surfaces during inward movement thereof when shock forces are applied to the draft gear whereby to produce high frictional resistance and absorption of a substantial portion of the shock forces, inward movement of the friction shoes being resisted by the aforementioned resilient means in the casing.

In the development of friction draft gears of the type characterized by a generaly hexagonal friction bore and by a series of three generally V-shaped friction shoes receivable therein, it was found that two primary disadvantages resulted from the so-called "equal angle" friction clutch, that is, a friction clutch wherein the inner friction surfaces of all of the shoes and their complementary wedge friction surfaces were all at the same angle. These two disadvantages included, (1) an uneven and undesirable closure pattern as a result of intermittent catching and slipping of all of the shoes at once during closure of the friction clutch, and (2) locking or jamming of the friction shoes in their innermost positions after removal of the closure force. Thus, in order to overcome the foregoing disadvantages, many of the first commerically successful friction draft gears of this general type were characterized by sets of three friction shoes having their inner friction surfaces disposed at different or unequal angles and by wedge members having their corresponding friction surfaces likewise disposed at different angles even though these so-called "unequal angle" friction clutches were, for obvious reasons, more expensive and difficult to manufacture. Because of the unequal angles, the catching and slipping of the three shoes of each set were staggered so that all of the three shoes would not either catch or slip at the same time, as did the equal angle shoes.

It was then found that by lubricating the friction bores with a suitable metallic lubricant, lead for instance, the foregoing earlier detected disadvantages could be substantially overcome in the more desirable so-called "equal angle" friction clutches.

One of the first methods used in applying metallic lubricant in friction clutch bores included forming circumferentially extending grooves in the friction bore surfaces and then hand-pounding lead or some other suitable metallic lubricant into same. One of the basic objections to this method of application is that it is time-consuming and therefore not only causes a bottleneck in draft gear casing production but also results in high production costs. Another objection to this method of applying a metallic lubricant in a friction bore is that it is very difficult to uniformly apply a specified quantity of such lubricant to a particular friction surface or to apply uniform quantities to each friction surface of a multi-surface friction bore.

It is, therefore, the general object of the present invention to provide a new and improved method for lubricating the friction bores of draft gears without the foregoing disadvantages of the methods presently in use.

Another important object of the present invention is to provide new and novel preformed metallic lubricant inserts for use in lubricating the friction bores of draft gears.

Another important object of the present invention is to provide a new and improved method of lubricating the friction bore of a draft gear including the steps of prepositioning one or more preformed inserts formed of a metallic lubricant within a friction bore, completing assembly of the draft gear including the friction shoes, the wedge, the resilient means and any follower members, and then compressing the gear to full closure a specified number of times whereby the friction shoes serve to uniformly wipe and deposit the metallic lubricant over and between the friction surfaces of the friction bore and the friction shoes.

Another object of the present invention is to provide new and novel preformed metallic lubricant inserts of the character described having configurations which are complementary to the friction bores in which same are to be received and which have distinctive projections which are adapted to be received in complementary recesses formed in the friction bores to aid in properly positioning the inserts therein.

A still further object of the present invention is to provide a new and improved method of the character described for lubricating a friction bore wherein the metallic lubricant inserts are temporarily retained in the friction bore by means of a suitable adhesive applied therebetween.

Other important objects of the present invention are to provide a new and improved draft gear friction bore lubricating method of the character described which is much faster than the methods presently in use and which therefore reduces production bottlenecks and lowers production costs and to provide a new and improved lubricating method as described which not only facilitates application of a predetermined quantity of metallic lubricant on a friction surface but also uniform distribution thereof.

While the foregoing statements are indicative in a general way of the nature of the invention, other objects and advantages will become apparent to those skilled in the art from the following detailed description taken in connection with the accompanying drawings, in which:

FIG. 2 is an enlarged scale perspective view from above looking toward the backside of a preformed lead insert adapted to be used in the friction bore shown in FIG. 1 for lubricating same in accordance with the invention as described herein;

FIG. 3 is an enlarged scale perspective view from above looking toward the left side of the lead insert as shown in FIG. 2;

FIG. 5 is an enlarged scale transverse vertical section through the friction shell portion of the draft gear casing with the lead inserts positioned therein, the section being taken generally on the line 5—5 of FIG. 4;

FIG. 6 is a longitudinally broken top plan view of a fully assembled draft gear having its friction bore lubricated in accordance with the present invention with the left-hand portion of the view being broken away and shown in central horizontal section;

FIG. 7 is an enlarged scale transverse vertical section taken through one of the friction shoes, the section being taken generally on the line 7—7 of FIG. 6;

FIG. 8 is a perspective view from above looking toward the backside of a modified form of lead insert in accordance with the invention;

FIG. 9 is a perspective view from above looking toward the left side of the lead insert as illustrated in FIG. 8;

FIG. 10 is a perspective view from above looking toward the backside of a still further modification of a lead insert in accordance with the invention; and FIG. 11 is a perspective view from above looking toward the left side of the lead insert as illustrated in FIG. 10.

Figure 1:
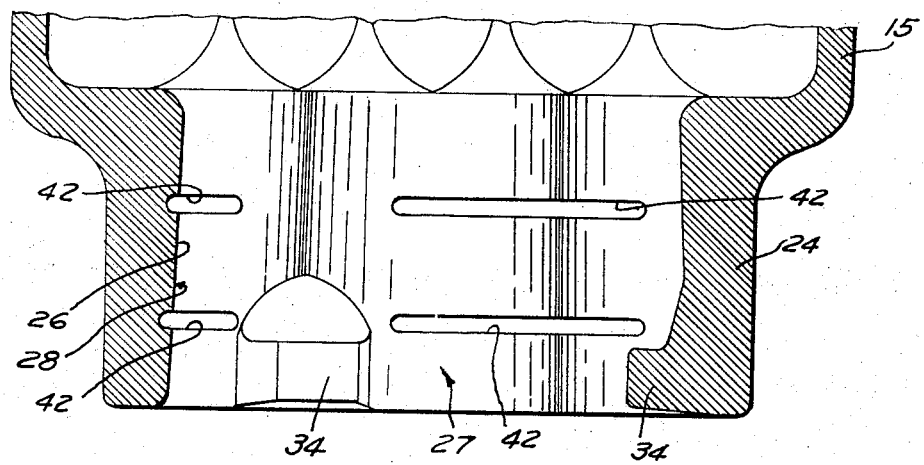
FIG. 1 is a central horizontal section taken through the friction shell portion of a friction draft gear casing prior to assembly of the other elements of the draft gear in the casing.

As shown in FIGS. 1, 4, 5 and 6 of the drawings, a friction draft gear fabricated in accordance with the method of the present invention includes a gear casing 15, a wedge 16, a set of three friction shoes 17, and a series of elastomeric pads 18.

The gear casing 15, as shown in FIG. 6, is in the form of a hollow tubular member which is open at its front and rear ends. The open rear ends 19 is normally closed by a two-piece removable rear wall 20 of the type which is disclosed in U.S. Patent No. 2,953,260, dated Sept. 20, 1960. The removable rear wall 20 which includes a central plug-like wall portion 21 and an outer locking ring portion 22 permits insertion of the elastomeric pads 18 into the casing 15 through the open rear end 19 thereof. It is to be understood that the gear casing could also have a fixed integral rear wall if other means were available for positioning the elastomeric pads or other resilient resistance means therein.

The casing 15 is further characterized by a necked-down portion 24 at its open front end with the bore thereof being generally hexagonal in transverse cross section (FIG. 5) and having six friction surfaces 26 which converge at a slight angle in a direction toward the rear end of the casing 15 whereby to define a friction bore 27 of a type well-known in the art. In the friction draft gear art, the hexagonal friction bore 27 may more properly be described as defining three circumferentially spaced generally V-shaped corner friction surfaces 28 disposed in alternate corners of the bore 27. The V-shaped surfaces 28 are adapted to accommodate the three friction shoes 17 which are generally V-shaped in transverse cross section (FIG. 7).

The three friction shoes 17, which are identical in configuration, are each characterized by outer V-shaped friction surfaces 29 which are complementary to the generally V-shaped corner friction surfaces 28 of the friction bore 27. The shoes 17 are also characterized by inclined inner friction surfaces 30 which co-act with complementary inclined friction surfaces 31 on the wedge 16 in a manner well-known in the art. As the friction surfaces 30 of the shoes 17 and the friction surfaces 31 of the wedge 16 are all disposed at the same angle, the friction clutch defined by the friction bore 27, the shoes 17, and the wedge 16 may be described as an "equal angle" friction clutch. The wedge 16 is further characterized by a series of three circumferentialy spaced lugs 33 (only one being shown) which extend radially outwardly therefrom and which are engageable behind a series of three circumferentially spaced lugs 34 which extend radially inward from the open end of the friction bore 27 to retain the wedge 16 and the friction shoes 17 in assembled relationship in the gear casing 15. The lugs 34 are disposed in alternate corners of the hexagonal friction bore 27 between the V-shaped corner friction surfaces 28.

The inner ends of the friction shoes 17 are engaged by an annular raised shoulder portion 36 of a follower member 37 which is disposed in the gear casing 15. Inward movement of the wedge 16 and the shoes 17 when shock forces are applied to the draft gear is registered by a columnar stack of the elastomeric pads 18 disposed between the follower member 37 and the removable rear wall 20 whereby to produce high frictional resistance and absorption of a substantial portion of the shock forces in a manner well-known in the art. The pads 18 which are of a known type are each characterized by a central pad portion 39 of elastomeric material which is bonded between a pair of non-extensible rigid support elements or plates 40 and which has concavely dished edges, as illustrated.

As best illustrated in FIG. 1, the generally V-shaped friction surfaces 28 of the friction bore 27 are each provided with a pair of parallel, axially spaced circumferentially extending elongated shallow recesses or grooves 42 formed therein. The grooves 42 are adapted to have a quantity of relatively soft metallic lubricant material, such as lead, disposed therein whereby to provide lubrication of the friction bore 27. Such lubrication of the friction bore 27 serves to prevent intermittent catching and slipping of all of the "equal angle" friction shoes 17 at once during actuation of the friction clutch and also serves to prevent locking or jamming of the shoes 17 in their innermost positions. In the past, the lead or other metallic lubricant material was hand-pounded into the grooves 42. This method was not only time-consuming and thus resulted in production bottlenecks and high production costs but also required rigid inspection because of the difficulty of uniformly applying specified quantities of such metallic lubricant material.

The present invention is therefore primarily directed to a new and improved method for lubricating friction bores, such as the friction bore 27 ilustrated in the drawings, and to the development of new and novel preformed friction bore lubricating inserts which are formed of a suitable metallic lubricant material.

A preformed lubricating insert 45 formed of a suitable relatively soft metallic lubricant material, such as lead, is illustrated in FIGS. 2 and 3 of the drawings. The insert 45, which is relatively thin and generally rectangular in configuration and which is intended for use in lubricating the friction bore 27 shown in FIG. 1, is formed to the contour of the generally V-shaped corner friction surface 28. Therefore, the generally V-shaped insert 45 is characterized by an outer surface 47 which is complementary to the generally V-shaped corner friction surface 28 of the friction bore 27 and by an inner surface 49 which is complementary to the outer generally V-shaped friction surface 29 of one of the friction shoes 17. The insert 45 is further characterized by a pair of parallel elongated projections or embossments 51 which extend transversely thereof and which are complementary to and adapted to be received in a pair of the grooves 42 provided in each of the V-shaped friction surfaces 28 of the friction bore 27 whereby to not only aid in properly positioning the insert 45 relative to one of the V-shaped bore surfaces 28 but also to lock the insert 45 in position therein during actuation of the draft gear, as will be described hereinafter.

Figure 4:
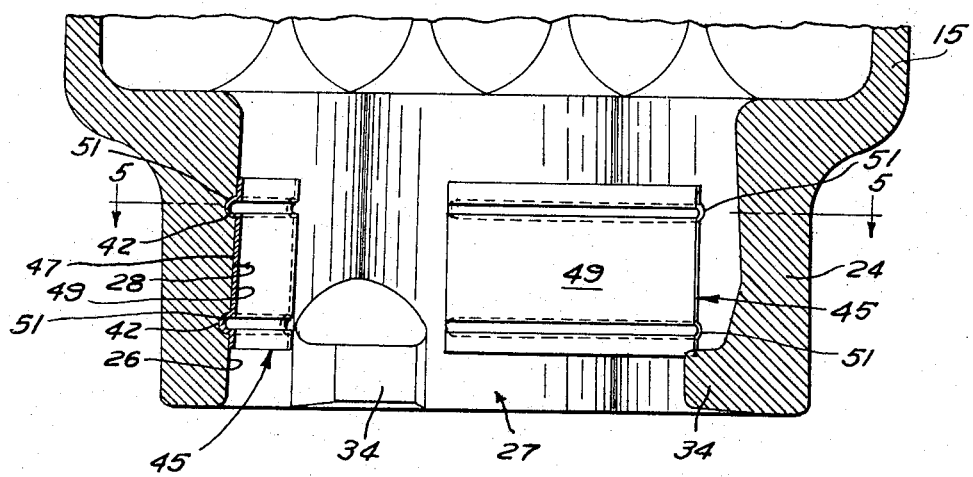
FIG. 4 is a central horizontal section through the friction shell portion of the draft gear casing as illustrated in FIG. 1 after a series of the lead inserts illustrated in FIGS. 2 and 3 have been positioned therein, the section being taken generally on the line 4—4 of FIG. 5.

To lubricate the friction bore 27 as shown in FIG. 1 in accordance with the new and improved method of the present invention, three of the preformed lubricating inserts 45 are positioned in the friction bore 27 each flush against one of the generally V-shaped corner friction surfaces 28 with their embossments 51 seated in the grooves 42, as best illustrated in FIGS. 4 and 5. A suitable adhesive may be used between the friction surfaces 28 and the outer surfaces 47 of the inserts 45 to more securely retain the inserts 45 flush against the friction surfaces 28 until final assembly of the friction draft gear has been completed. After the inserts 45 have been properly positioned in the friction bore 27, assembly of the draft gear is completed by inserting the friction shoes 17 into the friction bore 27, positioning the wedge 16 in the pocket defined by the inner friction surfaces 30 of the shoes 17 and engaging the lugs 33 thereon behind the lugs 34 at the open front end of the casing 15, then inserting the follower member 37 and the proper number of the elastomeric pads 18 into the casing 15 through the open rear end 19 thereof, and then assembling the removable rear wall 20 in the open rear end 19 of the casing 15 in a manner known in the art.

The final step of the friction bore lubricating method of the present invention involves actuating the assembled draft gear one or more times, for instance by means of a heavy duty drop hammer, whereby the friction shoes 17 are moved inwardly of the friction bore 27 simultaneously as they are forced radially outward against the inserts 45 whereby substantial squeeze forces are exerted on the inserts 45. Although this actuation of the draft gear serves to destroy the three inserts 45, the metallic lubricating material thereof is uniformly spread or wiped over the V-shaped friction surfaces and into the pores thereof whereby to form very thin films 53 of lubricant, as best shown in FIG. 6, which provide full lubrication of the described friction areas. During the foregoing actuation of the assembled gear, the grooves 42 provided in the friction surfaces 28 are packed with the metallic lubricant material of the inserts 45, as best shown in FIG. 6. The grooves 42 thus serve as storage areas or reservoirs for the metallic lubricant material during long service of the friction draft gear.

Together with the simplicity and the savings in time and effort which characterize the new and novel lubricating method of the present invention, another one of the important advantages of same is that a specified quantity of metallic lubricant material may be uniformly applied to any friction surface and that a friction bore having multiple friction surfaces may have specified equal quantities of such lubricant uniformly applied thereto. Thus inspection of lubricated friction bores to insure the proper application of metallic lubricant therein is vastly simplified. Another advantage which is of importance is that the lubricating inserts of the invention may be made in large quantities and stored in convenient locations well prior to the time that same may be needed in gear assembly. A still further advantage of real merit is that the lubricating inserts may be very quickly fitted in a friction bore without the use of any special tools or other mechanical contrivances either at the time of final assembly of the friction draft gear or well prior thereto.

The preformed lubricating inserts 45 of the invention may be formed in any one of a number of different ways depending upon the particular circumstances and the equipment available. For instance, the inserts 45 could be cast out of molten metal in suitable molds, which molds could conceivably be constructed from segments of old or scrapped friction bores and their mating friction shoes. The inserts 45 could also be fabricated by extrusion or by die forming same using either a press or a hammer.

It is noted that the contour of the preformed friction-bore lubricating inserts of the invention and the configuration or pattern of the projections or embossments thereon are not limited to those of the inserts 45 illustrated in FIGS. 2 and 3. It is only necessary that the inserts have contours which are complementary to the friction surfaces in the friction bores in which same are to be used and that any embossments thereon be complementary to any shallow recesses or grooves formed in the bore friction surfaces.

For instance, two preformed inserts, which, although they have the same generally V-shaped contour as the insert 45 of FIGS. 2 and 3, are characterized by different configurations or patterns of embossments than the embossments 51 of the insert 45, are shown respectively in FIGS. 8 and 9 and in FIGS. 10 and 11. In FIGS. 8 and 9, a generally V-shaped preformed lubricating insert 55 is characterized by a series of axially and circumferentially spaced elongated groove-like projections or embossments 56. In FIGS. 10 and 11, a generally V-shaped lubricating insert 58 is characterized by a plurality of circular dimple-like embossments or projections 59. Obviously, the invention is not limited to the specific lubricating inserts illustrated in the drawings.

Since certain changes may be made in the foregoing friction bore lubricating method and the preformed lubricating inserts of the present invention, without departing from the spirit and scope thereof, it is intended that all matters shown in the accompanying drawings and described hereinbefore shall be interpreted as illustrative and not in a limiting sense, the invention being susceptible of incorporation in other forms coming equally within the scope of the appended claims.

What is claimed as new is:

1. A method of lubricating a non-planar friction surface of an inwardly converging friction clutch bore of a friction draft gear of the type having a series of friction clutch members slidable in the friction bore, which method comprises the steps of positioning relatively thin preformed insert means of metallic lubricant which are generally complementary in configuration to the non-planar friction surface of said friction bore in said friction bore flush against said friction surface, and then assembling the rest of the draft gear including said slidable friction members and actuating said friction clutch a number of times with said slidable friction members being wedged inwardly and radially outwardly of said friction bore whereby said metallic lubricant of said insert means is spread uniformly over said friction surface to lubricate same.

2. A method of lubricating a generally V-shaped friction surface of a generally hexagonal inwardly converging friction clutch bore of a friction draft gear of the type having a series of three generally V-shaped complementary movable friction clutch members slidable in alternate corners of the generally hexagonal friction bore, which method comprises the steps of positioning a preformed generally V-shaped insert of metallic lubricant which is complementary in configuration to the generally V-shaped corner friction surface in said friction bore corner, and then assembling the rest of the draft gear including said slidable friction members and actuating said friction clutch a number of times with said slidable friction members being wedged inwardly and radially outwardly of said friction bore whereby said metallic lubricant of said insert is spread uniformly over said corner friction surface to lubricate same.

3. The method recited in claim 2 wherein a suitable adhesive is applied between said corner friction surface and said preformed insert to retain said insert against said corner friction surface until actuation of said friction clutch.

4. The method recited in claim 2 wherein said metallic lubricant material of said preformed insert is lead.

5. A method of lubricating the three generally V-shaped friction surfaces of a generally hexagonal inwardly converging friction clutch bore of a friction draft gear of the type having a series of three generally V-shaped complementary movable friction clutch members slidable in alternate corners of the generally hexagonal friction bore, which method comprises the steps of positioning three preformed generally V-shaped inserts of metallic lubricant which are complementary in configuration to the generally V-shaped corner friction surfaces in said friction bore corners, and then assembling the rest of the draft gear including said slidable friction members and actuating said friction clutch a number of times with said slidable friction members being wedged inwardly and radially outwardly of said friction bore whereby said metallic lubricant of said inserts is spread uniformly over said corner friction surfaces to lubricate same.

6. A preformed friction bore lubricating insert which is characterized by being formed of a metallic lubricant, and by being relatively thin and having a configuration which is generally complementary to a pair of mating relatively movable friction surfaces between which it is desired that a very thin film of metallic lubricant be uniformly distributed, said preformed insert being further characterized by one or more embossments which are complementary to and are adapted to be received in one or more shallow recesses formed in one of said friction surfaces to be lubricated whereby to aid in properly positioning said insert relative thereto prior to relative movement between said pair of mating friction surfaces.

7. A preformed friction bore lubricating insert for a friction draft gear having a friction bore and one or more friction members slidable therein, said insert being characterized by being formed of a relatively soft metallic lubricant material, and by being relatively thin and having a configuration which is complementary to both the friction surface configuration of the friction bore and to a mating friction surface of one of said a slidable friction members, said insert being adapted to be disposed against said bore friction surface prior to sliding movement of said friction member relative thereto whereby a thin film of said metallic lubricant material is uniformly distributed over said bore friction surface upon actuation of the draft gear, said preformed insert being further characterized by one or more embossments which are complementary to and are adapted to be received in one or more shallow recesses formed in said bore friction surface to be lubricated whereby to aid in properly positioning said insert relative thereto prior to said sliding movement of said friction member.

8. A preformed lubricating insert as recited in claim 7 wherein said embossments and said shallow friction surface recesses to which said embossments are complementary comprise spaced parallel elongated grooves which extend circumferentially of the friction bore.

9. A preformed friction bore lubricating insert for a friction draft gear having a generally hexagonal friction bore and a series of three generally V-shaped friction shoes slidable in alternate generally V-shaped corners of same, said insert being characterized by being formed of a relatively soft metallic lubricant material, and by being relatively thin and having a generally V-shaped configuration which is complementary to both the generally V-shaped corner friction surface configuration of the generally hexagonal bore and to the mating generally V-shaped friction surface of one of said friction shoes, said insert being adapted to be disposed against said corner friction surface during sliding movement of said friction shoes in said friction bore whereby to uniformly distribute a thin film of said metallic lubricant over said corner friction surface.

References Cited

UNITED STATES PATENTS

| | | | |
|---|---|---|---|
| 514,621 | 2/1894 | Heggem | 92—155 |
| 1,396,896 | 11/1921 | Symons | 213—31 |
| 1,426,022 | 8/1922 | Thomson | 92—155 |
| 2,141,680 | 12/1938 | Barrows | 213—32 X |
| 2,558,117 | 6/1951 | Withall | 213—32 X |
| 2,852,097 | 9/1958 | Proctor. | |
| 3,133,477 | 5/1964 | Meijer | 92—155 |

LAVERNE D. GEIGER, *Primary Examiner*

E. J. EARLS, *Assistant Examiner.*